United States Patent
Carroll et al.

(10) Patent No.: US 6,356,882 B1
(45) Date of Patent: Mar. 12, 2002

(54) METHOD AND SYSTEM FOR INPUTTING A WEIGHT TO A BROWSER IN AN INTERNET-BASED SHIPPING SYSTEM

(75) Inventors: Terri A. Carroll, Trumbull; David A. Ellis, Wallingford; Jacques Hasbani, Easton, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/476,007

(22) Filed: Dec. 29, 1999

(51) Int. Cl.⁷ .............................................. G07B 17/00
(52) U.S. Cl. ........................ 705/401; 705/410; 713/1; 713/2; 713/100
(58) Field of Search ................... 705/401, 410; 709/220, 221, 222; 713/1, 2, 100

(56) References Cited

U.S. PATENT DOCUMENTS

| | | | | |
|---|---|---|---|---|
| 5,369,401 A | * | 11/1994 | Haines ........................ | 705/403 |
| 5,710,706 A | * | 1/1998 | Markl et al. ................. | 705/409 |
| 5,852,813 A | * | 12/1998 | Guenther et al. ............ | 705/408 |
| 5,983,209 A | * | 11/1999 | Kara .......................... | 705/407 |
| 6,067,568 A | * | 5/2000 | Li et al. ...................... | 709/223 |
| 6,199,108 B1 | * | 3/2001 | Casey et al. ................. | 709/220 |

FOREIGN PATENT DOCUMENTS

WO   WO-97/14117 A2 *  4/1997

OTHER PUBLICATIONS

"Function Signature Architecture for Personal Computer Systems"; IBM Technical Disclosure Bulletin, Oct. 1, 1988, vol. 31, No. 5, pp. 62–66.*

Aherns: Making mail pay: upgrading mail operations to save time and money. (includes list of U.S. Postal Service contacts for corporate representatives to learn how to save money on postal service)(75th Anniversary Edition) [continued below].*

(Special Advertising Supplement), Forbes, Sep. 14, 1992, vol. 150, No. 6, p. 239.*

* cited by examiner

Primary Examiner—Edward R. Cosimano
(74) Attorney, Agent, or Firm—Ronald Reichman; Paul A. Levitsky; Michael E. Melton (57) ABSTRACT

The invention is a method and system for inputting the weight of a parcel into a web-based shipping application of a data processing system. The data processing system comprises a web site for a provider server and a client node in communication with the provider server. The web site further comprises web pages and script functionality for linking with a scale driver resident in a weighing scale located at the client node. The weighing scale comprises a scale server resident ultimately at the client node, but callable by the client node under control of the script functionality for allowing the script at the client node to link with the weighing scale by utilizing the scale driver. The method begins with the calling of the web site, from the client node, by utilizing a communications link which includes a browser for accessing the web site. The client node requests that a scale activation routine be activated. The routine includes the use of script to call an Active-X automation server, which is downloaded, together with an appropriate scale driver, from the web site to the client node. The system user then logs onto the shipping application and inputs a set of shipping parameters into the application. The parcel is weighed on a weighing scale under control of the scale driver. The shipping application requests the weight from the scale server by way of the script call and then enters the weight, through the browser into the shipping application.

23 Claims, 5 Drawing Sheets

METHOD AND SYSTEM FOR INPUTTING A WEIGHT TO A BROWSER IN AN INTERNET-BASED SHIPPING SYSTEM

RELATED APPLICATIONS

Reference is made to co-pending patent application Ser. No. 09/474,585, entitled A METHOD AND SYSTEM FOR COMMUNICATING WITH A POSTAGE METER THROUGH A WEB-BROWSER IN A POSTAL OR SHIPPING SYSTEM, assigned to the assignee of this application and filed on even date herewith.

Reference is made to U.S. Pat. No. 6,282,590 entitled A METHOD AND SYSTEM FOR ESTABLISHING A STANDARD PERIPHERAL INTERFACE SERVER, assigned to the assignee of this application and issued on Aug. 28, 2001.

FIELD OF THE INVENTION

The present invention relates generally to the field of mail piece and/or parcel weighing and processing in a network; and, more specifically, to the field of determining the weight of an item for mailing or shipping through the use of an internet or intranet data processing environment.

BACKGROUND OF THE INVENTION

Systems that allow the user to process parcels for delivery by a carrier are known as shipping systems; or, if the intent of the system is to allow the user to choose from among the services of more than one carrier, the system may be known as a carrier management system. By whatever name, these systems (hereinafter referred to as "shipping systems") are designed to prepare parcels in accordance with the regulations of the carrier that will be picking up the parcels for later delivery.

Traditional configurations of shipping systems include low-end embedded systems, mid-range personal computer (PC) based systems, and upper end mid and main frame based systems.

Embedded systems, where the shipping application is embedded within a shipping scale, generally include PROM-based rating tables and their associated functionality. Data entries to the application are made via an operator keypad on the front of the scale or by scanning bar codes or similar symbology directly to certain fields within the application. Table data and certain rating functionality is generally added through the use of PROMs, while weight data is generally entered from the scale driver directly to the application, or is entered by manual entry. The embedded systems are generally capable of producing a manifest for use by the carrier, as well as producing barcode or address labels for application to the parcel.

PC-based systems are more flexible then embedded systems because they allow a greater range of peripherals, greater memory capacity, networking capabilities (both internet and intranet) and the ability to store records and address lists while accepting data download in a variety of ways. Scales used with these types of systems are directed to recording weight under control of the shipping application. Rating and services functionality are also directed from the application, while the system shops for an appropriate rate from a database within a memory contained within the PC or from a rating table directed by a server. Address lists can be stored or forwarded as well. The ability of the PC-based system to provide a communications link to a network, while allowing integration with a client's information systems, is perhaps the greatest strength of these systems. Network links via the internet provide the system with an interface to a great number and variety of carrier web sites, increased functionality, and parcel tracking. Additionally, data relevant to shipping history for a particular location, or historical manifest data can be downloaded or uploaded in a quick and efficient manner as necessary.

The PC-based systems offer much the same functionality as the upper end mid and main frame systems. The upper systems, however, offer the advantage of exceptional processing speed while handling large volumes of transaction data or performing multi-tasking of application services, as well as application level integration with client systems.

Parcel shipping, in general, has benefitted from efficiencies associated with PC-based systems. Labels can be printed at the desktop, weighing scales are interconnected to PCs for inputting weight to parcel shipping applications, and manifests for recording the details of parcel pickup and delivery are printed at the desktop as well. Peripherals such as scanners and other input devices can also be added for increased data delivery. But, shipping applications still rely on an important piece of data in determining the cost of a shipment; that piece of data is weight. Parcel shipping is tied to the weight parameter in determining a cost for shipping a parcel because of the profusion of services available from individual carriers and the fact that parcels tend to be of varied weight and size.

In a PC-based environment that is serving as a stand alone system only, or that is part of a local area network (LAN), or even a wide area network (WAN), the weight of a parcel can be entered directly to a shipping application from the associated weighing scale. However, in an internet-based environment, there is currently no way to introduce the weight into the required fields of the shipping application while using an internet browser for internet-based applications being directed from a server. Traditionally, the method for adding weight to the shipping application while using the browser has involved the use of manual entry into the appropriate fields. Therefore, a method and system are required that allows the system user to enter weight data directly to the internet-based application while utilizing a browser.

Some developed technology has attempted to eliminate the need for utilizing a weighing scale for inputting the weight parameter in determining postage charges. One such method and system has been disclosed in U.S. Pat. No. 5,983,209 for a SYSTEM AND METHOD FOR DETERMINATION OF POSTAL ITEM WEIGHT BY CONTEXT issued Nov. 9, 1999 to Salim G. Kara (hereinafter referred to as Kara). In Kara, parameters are input into the system that are associated with the context in which the mail piece is generated; the parameters can be manually input or can be input by the application which is generating the associated mail piece.

One drawback to Kara is the flexibility of the disclosed system. Kara is specifically drawn to "postal items" and thus does not address the issues associated with carrier management or shipping systems that require more varied input in addition to performing rate shopping among multiple carriers. Kara, though providing access to a resident database for determining component weights in calculating postage values, does not provide a means of accessing non-resident databases; nor, does Kara provide a means for training its resident database so as to provide a greater range of rating variables. Of particular importance, however, is that Kara does not provide for a means of providing a weight to an internet-based shipping application directly from a scale.

Based on the aforementioned needs in the art, it is an object of the present invention to restore the ability of providing a weight to a shipping application that is resident on, or dependent upon, an internet link (or similar network-based link) utilizing a browser. It is a further object of the present invention to eliminate the use of manual entry of weight data into the appropriate fields of a carrier manager or shipping application when that weight is provided by a weighing scale.

SUMMARY OF THE INVENTION

According to the invention, the object is achieved and the disadvantages of the prior art are overcome by a method and system for inputting a weight of a parcel to be shipped into a shipping application of a data processing system. The data processing system comprises a web site for a provider server and a client node in communication with the provider server. The web site further comprises provider web pages and script functionality resident in the provider web pages for linking with a scale driver resident in a client computer that is in communication with a weighing scale attached at the client node. The client node can be one of a plurality of client nodes that are linked to the data processing system and wherein at least one, but as many as all of the plurality of client nodes, comprises a weighing scale for entering weight into the shipping application.

The weighing scale at the client node further comprises: a scale driver; a scale server resident first at the client computer but callable under control of the script functionality; and, script activation capability for allowing the script at the web site to link with the weighing scale by utilizing the scale driver.

The invention's method begins with the calling of a web site associated with the provider server, from the client node, by utilizing a communications link for linking the web site and the weighing scale at the client node. The communications link comprises: a browser for accessing the web site by the client node; a network interface routine for allowing access to a network wherein the web site resides; and, communications means for physically interfacing the weighing scale with the client node and then ultimately the network itself. A set of plug-ins for communication to the scale server may be required for certain browser types.

The client node requests that a scale activation routine be activated at the web site for download to the client node; thereafter, the routine is activated at the client node. The routine includes the use of script (such as JAVA™ script) to call an Active-X automation server. The script functionality further comprises: display functionality for displaying the weight in a particular format; a "get weight" function for directing the weight to be transmitted to the shipping application; a setup function for storing a set of steps to be used for activating the script functionality, the scale driver and the scale server; and, a set of instructions for performing one or more activities. The scale server is an Active-X automation server that is first resident on the web site, but is then downloaded to the client node. Download need only occur once as the server will then reside at the client computer within the client node. Once the automation server has been called, it is then downloaded, together with an appropriate scale driver, from the web site to the client node. Each of these steps can be saved as an initiation set to a memory resident in the provider server or in the client node. The initiation set may be called by either the client node or the provider server to establish the initiation set for future transactions.

When the automation server and the scale driver have been downloaded and installed, a system user tests a communication link between the weighing scale and the scale server as a setup or diagnostic tool prior to logging into the shipping application at the web site. The system user then logs onto the shipping application. The logging step further comprises the step of inputting a set of shipping parameters into the shipping application. The weight is entered into the shipping application for the purpose of obtaining a cost of shipping the parcel, the cost determined as a function of the weight and the set of shipping parameters. The set of shipping parameters further comprises: a destination; a class or type of service by which the parcel will be shipped; and/or, a period of time for a delivery of the parcel.

The parcel is weighed on a weighing scale under control of the scale driver. The shipping application requests the weight from the scale server by way of the script call and then enters the weight, through the browser into the shipping application. The request for the weight further comprises the steps of querying as to whether or not the weight is to be requested by the automation server through a script call; and, if the weight is to be called by the script call, then requesting the weight from the scale server automatically. If the weight is not to be requested by the script call, then the system user at the client node will make an entry into the shipping application via a response to a prompt on the web site.

DETAILED DESCRIPTION OF THE PREFERRED EMBODIMENTS

Figure 1A:
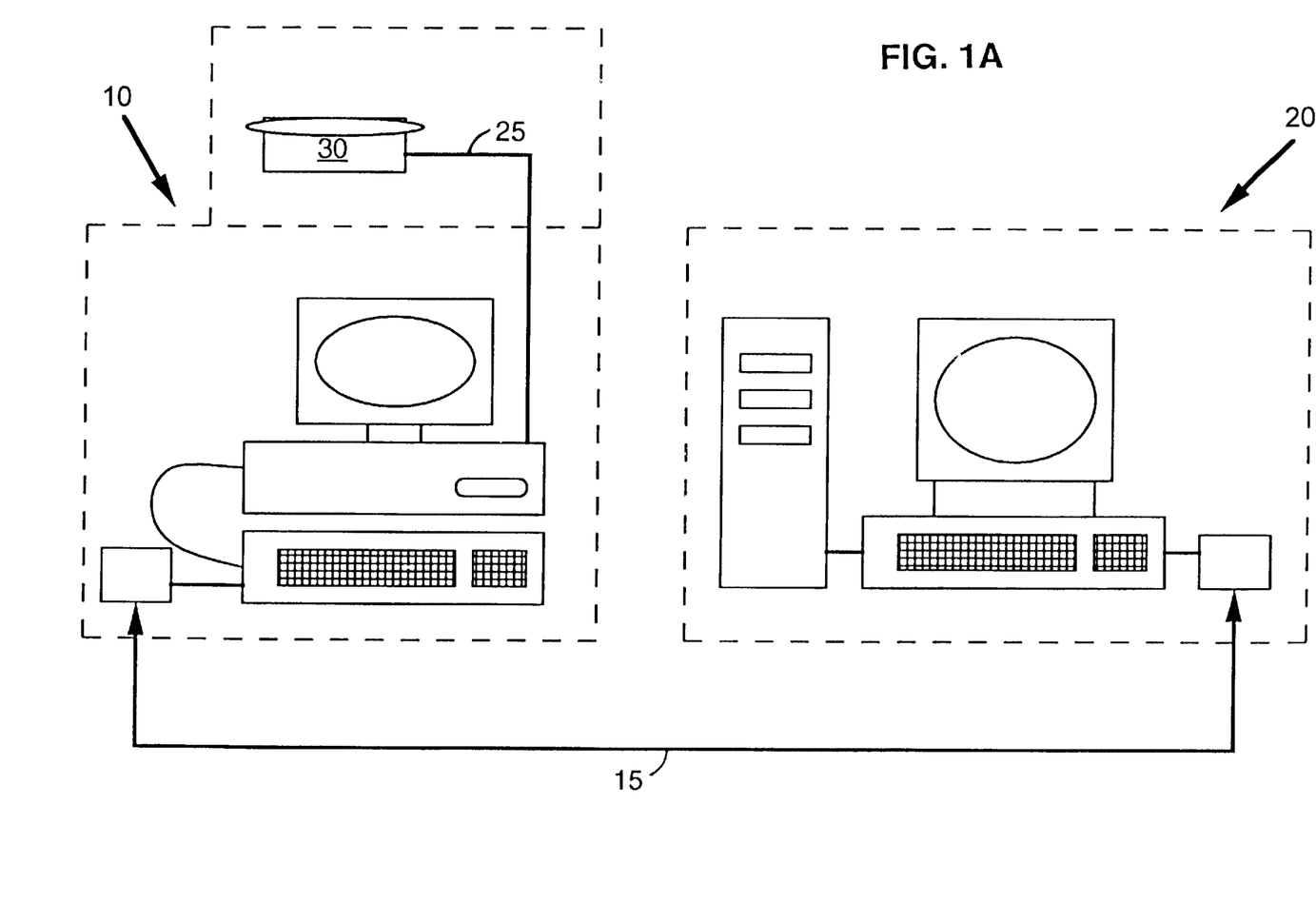
FIG. 1A is a diagram of the system of the present invention showing the elements of each of the high-level subsystems.

Beginning with FIG. 1A, there is shown a block diagram of the system of the present invention showing the flow between each of the high-level components of the system. A system user, who has a parcel or an article to be shipped via a carrier, accesses the overall system through subsystem 10.

Subsystem 10 is shown as a node which includes a personal computer for processing data and running certain software applications, a monitor for providing a human interface with the personal computer so as to view screens established by the application, and a keyboard for data entry. A modem link is also included that will allow access to interface 15. Interface 15, in the preferred embodiment, is an internet link; but, it is contemplated that the link could be any intranet or hardwired communication solution requiring a browser entry. Additional peripherals that are anticipated include a scanner for scanning barcodes and similar data, as well as a weighing scale 30 for inputting weight to the server-based shipping application. The weighing scale 30 is linked to subsystem 10 via communication link 25 which is preferably a hardwire, serial communication link.

Interface 15 links subsystem 10 with subsystem 20. Subsystem 20 is a remote server which can determine a rate for shipping a parcel in accordance with parameters established in the shipping application hosted by subsystem 20; a weight parameter is returned from weighing scale 30 through communication link 25 to subsystem 10 before entry into the shipping application.

Figure 1B:
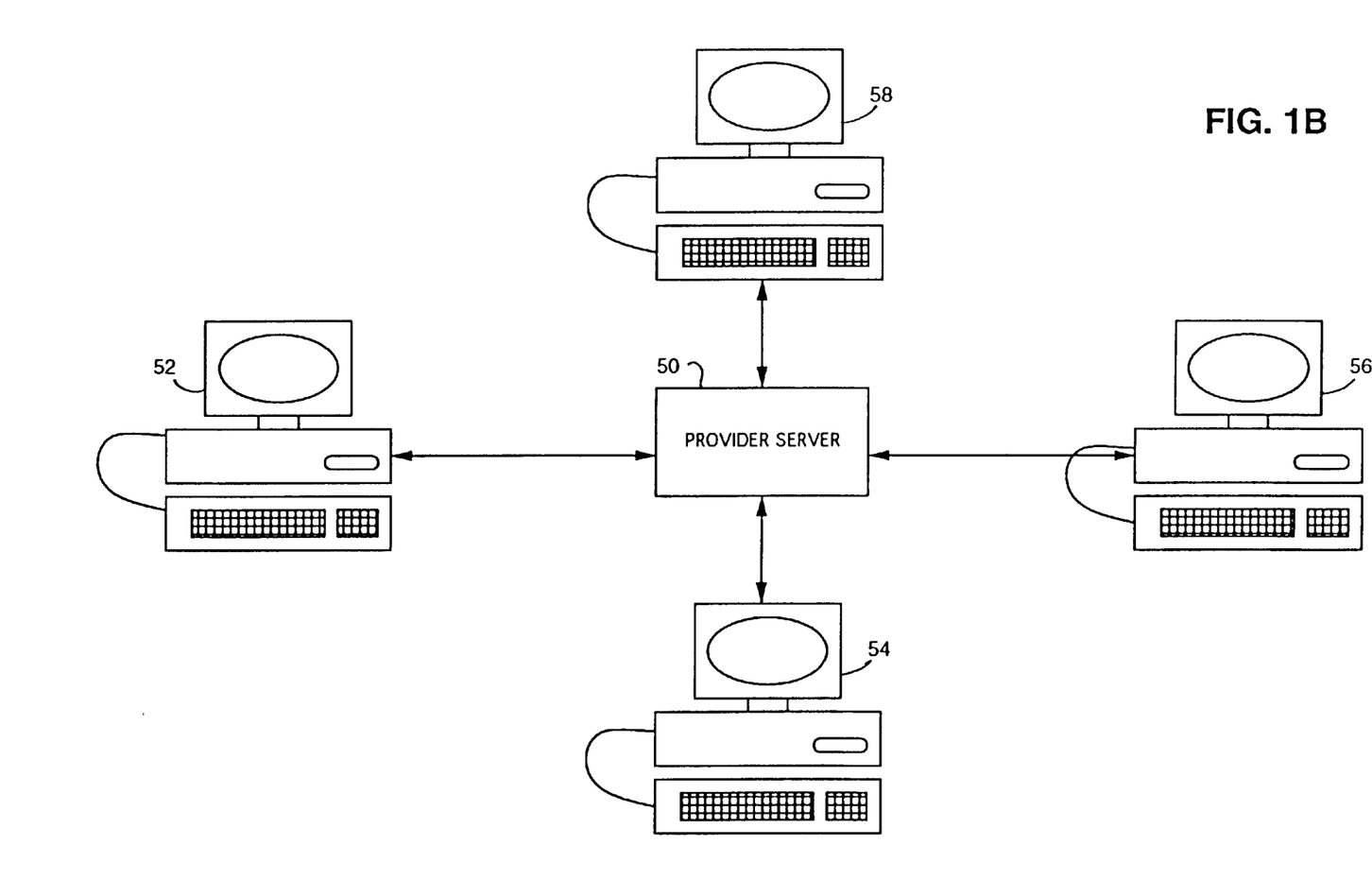
FIG. 1B is a diagram of a multi-node system wherein each node is in communication with a provider server.

Turning to FIG. 1B, there is shown a network consisting of multiple client nodes 52, 54, 56, and 58 wherein each node is linked to a common server 50. Each of client nodes 52, 54, 56, and 58 is shown as a node which includes a personal computer for processing data and running certain software applications, a monitor for providing a human interface with the personal computer so as to view screens established by the application, and a keyboard for data entry. A network or modem link is also included (though not shown) that will allow access, through a communications link, to the corresponding modem of server 50. The communications link, in the preferred embodiment, is an internet link; but, it is contemplated that the link could be any intranet or hardwired communication solution requiring a browser entry. Additional peripherals that are anticipated for each of client nodes 52, 54, 56, and 58 include a scanner for scanning barcodes and similar data, as well as a weighing scale for inputting weight to the server-based shipping application.

Figure 2:
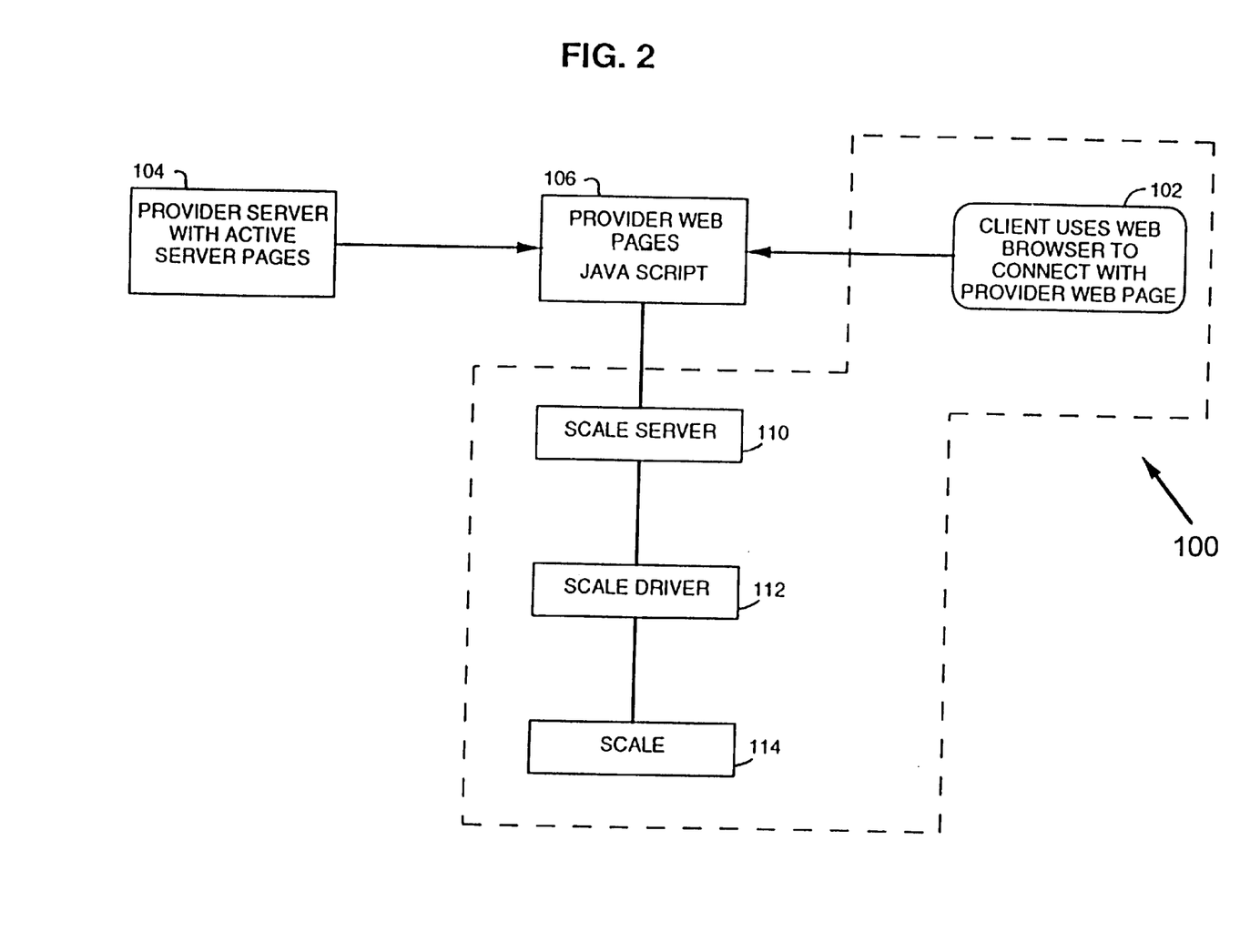
FIG. 2 is a relational diagram of the elements of the present invention showing the relationship between client, provider server and the weighing scale.

In FIG. 2, there is shown a relationship diagram that illustrates the relationship between client, provider server, and the weighing scale.

Subsystem 100 is representative of the client node functionalities that together interface with a provider server with active server pages 104 through the use of provider web pages JAVA script 106. Through a client node, the system uses a web browser to connect with provider web pages, at element 102, to connect with a provider server 104 and provider web pages 106 having certain downloadable elements. The provider web pages 106 is a Hypertext, Markup Language (HTML) page that contains JAVA script. These elements include active server pages that can be downloaded to the client node as required. HTML is known in the art and a detailed description of its architecture and implementation is not required for an understanding of the present invention.

The provider web server with active server pages 104 comprises a shipping application for preparing parcels to be shipped and possible carrier rating functionality or related services. This preparation might include production of labels, production of a carrier manifest representative of the transactions that the system user has with a particular carrier, and determination of the shipping parameters required or desired for the shipping of the parcel. The parameters include destination zone or location, time and/or date of delivery, and whether or not any special services are connected with the shipment.

The client node can be one of a plurality of client nodes as is shown in FIG. 1B, or simply a single node as is shown in FIG. 1A. The client node includes a personal computer for processing data and running certain software applications, a monitor for providing a human interface with the personal computer so as to view screens established by the application, and a keyboard for data entry. A network or modem link is also included that will allow access to the internet. The link, however, could be any intranet or hardwired communication solution requiring a browser entry. Additional peripherals include a scanner for scanning barcodes and similar data, as well as a weighing scale for inputting weight through the browser to the server-based shipping application. The weighing scale is linked to the subsystem via a communication link which is preferably a hardwire, serial communication link.

The internet link connects the system user's entry to the internet at element 102 with provider web pages 106 that are being posted by the provider web pages at 104. JAVA script 106 is contained within the web page and is used to connect the scale server 110 on the client side and to make the scale server 110 available for client use in conjunction with the scale driver 112 and communication with the weighing scale 114. The method by which this relationship is further defined is shown in the flowcharts of FIG. 3 and FIG. 4.

Figure 3:
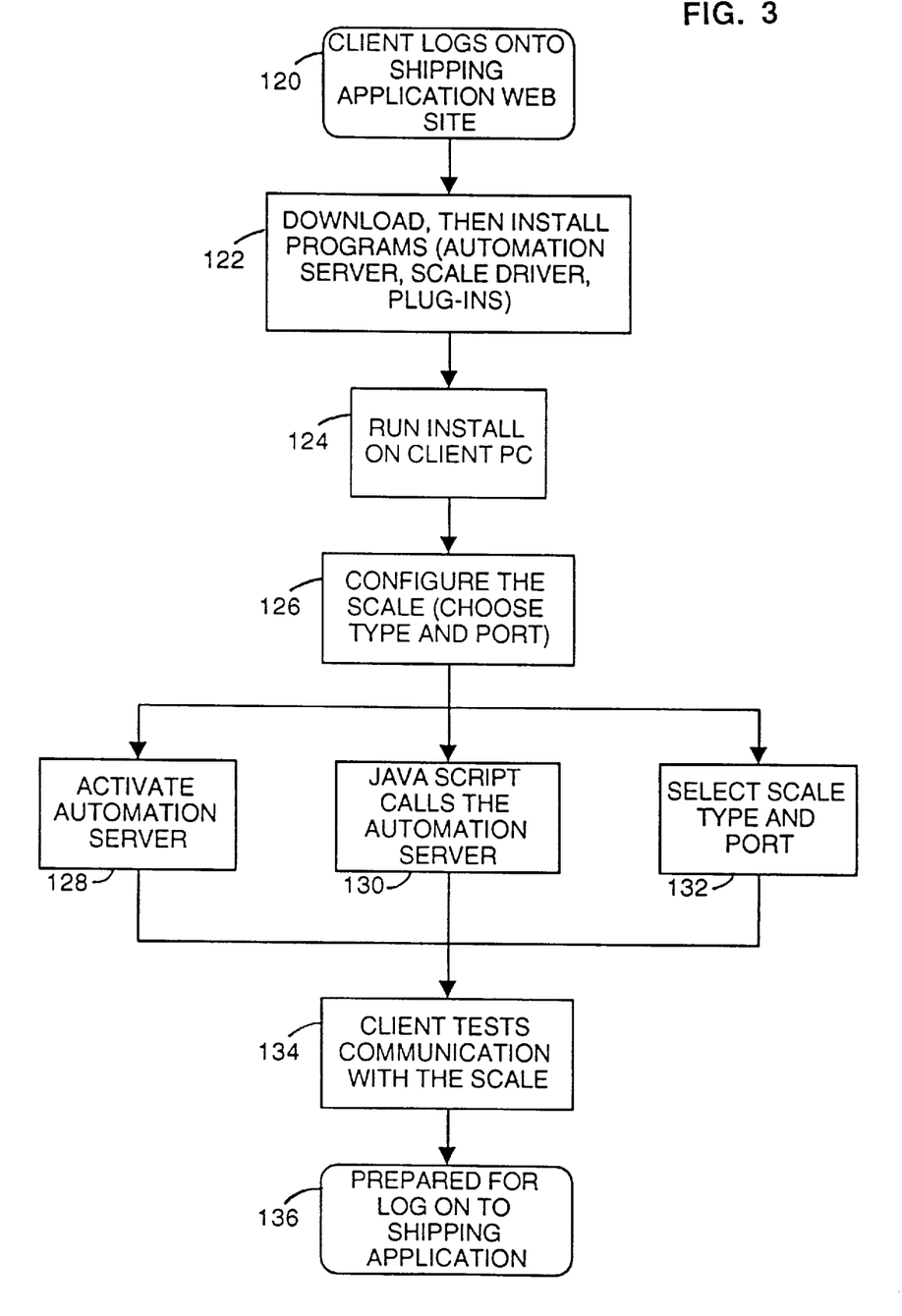
FIG. 3 is a flowchart of the method of the present invention from client initiation to preparation for logging onto the shipping application presented by the provider server; this is the download and setup process.
Figure 4:
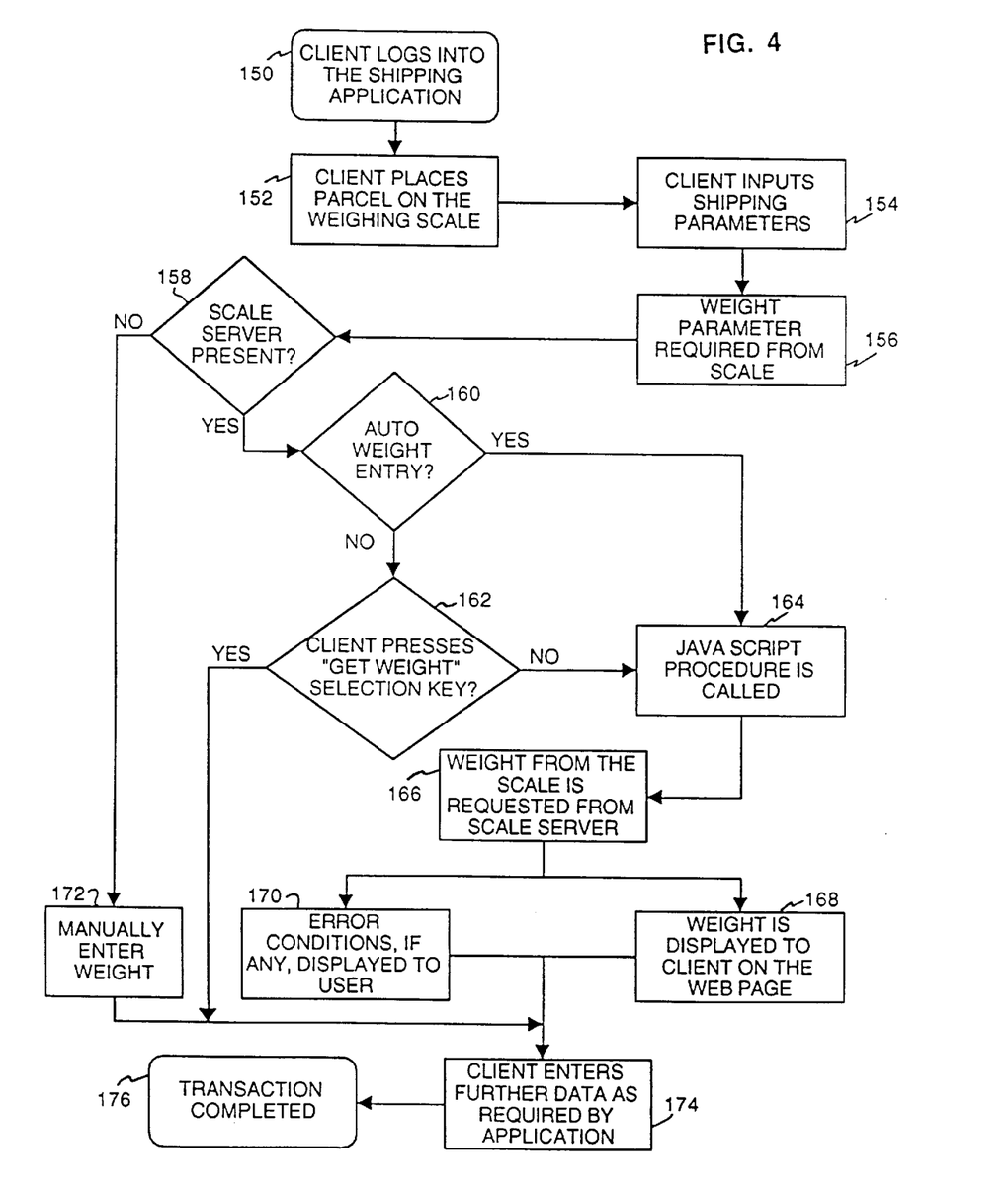
FIG. 4 is a flowchart of the method of the present invention from shipping application login to entering of the weight into the required fields of the shipping application via the browser.

Turning to FIG. 3, there is shown the flowchart of the method of the present invention from client initiation to preparation for logging onto the shipping application presented by the provider server.

The method flow begins at step 120 where the client logs onto the provider's shipping application web site by utilizing a browser for internet entry. Browsers are known in the art and a detailed discussion of them is not necessary for an understanding of the present invention. From step 120, the method advances to step 122 where the system user selects several programs to be downloaded from the web site; these include an automation server, the scale driver that corresponds to the weighing scale being employed at the client node, and any "plug-ins" that might be required for communication patching by the web browser. The programs are downloaded to the client node where they are saved for continued future use.

Plug-ins are Dynamic Link Libraries (DLL) that meet specifications defined by the web browser. DLLs are used to extend the functionality of the web browser beyond the capabilities built into their architecture by the browser developer. JAVA script will run, start its activation procedure, and then connect with the scale server on the client side to make the scale available for client use and input to the shipping application. The JAVA script can communicate with the Active-X automation server directly when using INTERNET EXPLORER™ as the browser for entry to the internet; however, when using a browser such as NETSCAPE™, a NETSCAPE "plug-in" is needed on the client side so that the JAVA script can communicate with the automation server through the plug in. The plug-in serves as a communication patch through which the automation server "talks" to the JAVA script. Once the connection to the weighing scale has been completed, the data from the weighing scale can be either automatically or manually transferred to the shipping application to update the required form fields.

Active-X is a set of integration technologies that enables software components to inter-operate in a networked environment using any programming language. Active-X controls are individual components that have a specific function (i.e., displaying a list box, displaying a command button, specified time delays, etc.) that when used together can create navigation tools and complete on-line applications. Active-X provides support for a wide-range of tools which include MICROSOFT® VISUAL BASIC™. Active-X is known in the programming arts and a detailed description of Active-X is not required for an understanding of the invention at hand. A detailed discussion of a method and system for establishing a standard peripheral server can be found in Related U.S. Pat. No. 6,282,590, and its teaching is incorporated herein by reference.

JAVA script, on the other hand, is a non-compiled programming language that is included in web pages and are run with a client web browser. JAVA script can perform a number of functions that benefit the ability of the provider server to read the weight of the weighing scale through the browser. These include: the ability to read a weight and define it in terms of units per kilogram or pound (units/kg./lb.); the "get weight" instructions; automatic or manual weight read; instructions to zero the scale for an accurate reading; communication setup; the ability to look for, and read, multiple scales; the ability to post error messages to the client and/or the system; and, the parameters for conducting a system test of the communication link between the weighing scale and the client node.

Returning to download, then install programs (automation server, scale driver, plug-ins) step 122, after download, the programs are installed at the client node and all future calls for the automation server will come from the client node. From step 122, the method advances to run install on client PC step 124 where the INSTALL routine is run on the client PC before advancing to configure the scale (choose type and port), step 126 where the weighing scale is configured by choosing a scale type and a communication port. As a part of configuration, three activities occur essentially simultaneously that prepare the client node for communication with the weighing scale; these activities occur at steps 128 JAVA Script calls the automation server, 130 active automation server, and 132 select scale type and port. At step 128 the Active-X automation server is activated at the client node. The JAVA script calls the automation server at step 130, and the scale type and communication port are selected at step 132. The method then advances to client tests communication with the scale, step 134 where the client tests the communication link with the weighing scale. If the communication test is successful, then the system goes to prepared for log on to shipping application step 136.

FIG. 4 is a flowchart of the method of the present invention from shipping application login to entering of the weight into the required fields of the shipping application via the browser.

At step 150, the system user, or "client," logs onto the shipping application of the provider server. From step 150, the method advances to step 152 where the client places the parcel to be shipped on the weighing scale to be weighed. The method advances to step 154 where the system user, i.e., client, inputs shipping parameters under prompt from the shipping application. These parameters may include: choice of carrier; parcel dimension (for dimensional weighing requirements); special handling instructions; destination codes and addresses; an addressee; delivery instructions; and, time parameters. During the course of the parameter entry, at step 154, the weight parameter will be required from scale at step 156 which prompts the query at step 158.

At step 158, the method queries as to whether or not a scale server is present at the client node. If the response to the query is "NO," then the method advances to step 172 where the system user manually enters the weight into the proper field of the shipping application. From step 172, the method advances to client enters further data as required by application at step 174. If the response to the query at step 158 is "YES," then the method advances to the query at step 160. At step 160, the method queries as to whether or not the weight entry is to be automatic or by manual entry. If the response to the query is "YES," then the method advances to step 164 where the JAVA script procedure is called before advancing to step 166 where the JAVA script requests weight from the scale server. From step 166, the method advances to step 168 where the weight is displayed to the system user, i.e., client, on the web page screen shown on the client node monitor. Returning to the query at step 160, if the response to the query is "NO," then the method advances to a query at step 162 which queries as to whether or not the client presses a "GET WEIGHT" selection key. The "GET WEIGHT" selection key can be a pull-down menu, a mouse "click box," an "F" key on the keyboard, a selection from a prompt, a touch screen selection if available, or even a designated keyboard entry. If the response to the "GET WEIGHT" selection is "NO," then the method advances to JAVA script procedure is called step 164 the JAVA script procedure is called before advancing to step 166 where the JAVA script requests weight from the scale server. If the response to the query at step 162 is "YES," however, then the method advances to the path client enters further data as required by application at step 174.

Returning to weight from the scale is requested from scale sever at step 166, the request for a weight results in the method path diverging and two steps to be performed essentially simultaneously at steps 168 "weight is displayed to client on the web page" and 170 "error conditions, if any, displayed to user". At step 168, the weight is displayed to the system user on the web page screen shown on the client node monitor; while at step 170, the method displays error conditions, if any, to the system user. From both steps 168 and 170, the method advances to step 174 where the system user enters any further data that may be required by the shipping application. The transaction is then concluded at step 176 transaction completed.

While certain embodiments have been described above in terms of the system within which the method may reside, the invention is not limited to such a context.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of inputting a weight of a parcel to be shipped to a shipping application data processing system, wherein said data processing system comprises a client node in communication with a provider server, said method comprising the steps of:
   (a) calling a web site associated with said provider server, from said client node, by utilizing a browser;
   (b) requesting by said client node that a scale activation routine be activated at said client node, wherein said routine comprises a script call of an automation server;
   (c) downloading said automation server from said web site to said client node;
   (d) downloading a scale server from said web site to said client node;
   (e) downloading a scale driver from said web site to said client node;
   (f) logging onto said shipping application;
   (g) weighing said parcel on a weighing scale;
   (h) requesting said weight from said scale server by said script call; and
   (i) entering said weight into said shipping application.

2. The method of claim 1, wherein said request of said weight further comprises the steps of:
   (a) querying as to whether or not said weight is to be requested by said script call, and if said weight is to be called by said script call then requesting said weight from said scale server; and (b) if said weight is not to be requested by said script call, then having a system user at said client node make said entry into said shipping application via a response to a prompt.

3. The method of claim 1, wherein said downloading of said automation server, said scale server, and said scale driver further comprises the steps of installing and configuring said automation server, said scale server, and said scale driver at said client node and wherein said installation and said configuration preclude the necessity for repeating said download for future transactions utilizing said weighing scale in conjunction with said web site.

4. The method of claim 1, wherein said weighing scale is configured through said web site by:

(a) identifying a set of characteristics of said weighing scale; and (b) downloading said scale driver from said web site to said weighing scale in accordance with said set of characteristics.

5. The method of claim 1, wherein a system user tests a communication link between said weighing scale and said scale server prior to logging onto said shipping application at said web site.

6. The method of claim 1, wherein each of said steps (b) through (d) are individually saved as an initiation set to a memory resident in said provider server and wherein said initiation set may be called by said client node to establish said initiation set.

7. The method of claim 1, wherein each of said steps (b) through (d) are individually saved as an initiation set to a memory resident in said client node and wherein said initiation set may be called by the client node to establish said initiation set.

8. The method of claim 1, wherein said client node is one of a plurality of client nodes that are linked to said data processing system.

9. The method of claim 8, wherein each one of said plurality of client nodes comprises a weighing scale for entering weight into said shipping application.

10. The method of claim 1, wherein said logging step further comprises the step of inputting a set of shipping parameters into said shipping application.

11. The method of claim 10, wherein said set of shipping parameters further comprises a destination.

12. The method of claim 10, wherein said set of shipping parameters further comprises a class or type of service by which said parcel will be shipped.

13. The method of claim 10, wherein said set of shipping parameters further comprises a period of time for a delivery of said parcel.

14. The method of claim 10, wherein said weight is entered into said shipping application for the purpose of obtaining a cost of shipping said parcel, said cost determined as a function of said weight and said set of shipping parameters.

15. A system for entering a weight into a shipping application of a data processing system, said system comprising:

(a) a web site for a provider server, said web site further comprising:
  (i) provider web pages;
  (ii) script functionality resident in said provider web pages for linking with a scale driver resident in a weighing scale located at a client node;

(b) a weighing scale at said client node, said weighing scale further comprising:
  (i) said scale driver;
  (ii) a scale server resident at said client node and callable by said client node under control of said script functionality;
  (iii) script activation capability for allowing said script at said client node to link with said weighing scale by utilizing said scale driver;

(c) a communications link for linking said web site and said weighing scale at said client node, said communications link further comprising:
  (i) a browser for accessing said web site by said client node;
  (ii) a network interface routine for allowing access to a network wherein said web site resides; and
  (iii) communications means for physically interfacing said weighing scale with said network.

16. The system of claim 15, wherein said script functionality is Java script.

17. The system of claim 15, wherein said browser requires a set of plug-ins for communication to said scale server.

18. The system of claim 15, wherein said scale server is an Active-X automation server resident on said web site and downloadable to said client node.

19. The system of claim 15, wherein said client node is one of a plurality of client nodes, each of said plurality of client nodes linked by communication means to said provider server, said communication means for establishing a communications link between said client node and said provider server.

20. The system of claim 15, where said script functionality further comprises a set of instructions for performing one or more activities.

21. The system of claim 20, wherein said script functionality further comprises display functionality for displaying said weight in a particular format.

22. The system of claim 20, wherein said script functionality further comprises a "get weight" function for directing said weight to be transmitted to said shipping application.

23. The system of claim 20, wherein said script functionality further comprises a setup function for storing a set of steps to be used for activating said script functionality, said scale driver, and said scale server.

* * * * *